US008437466B2

(12) United States Patent
Li et al.

(10) Patent No.: US 8,437,466 B2
(45) Date of Patent: May 7, 2013

(54) METHOD AND APPARATUS FOR RESUMING THE SESSIONS BETWEEN CLIENT DEVICE AND IVR SYSTEM

(75) Inventors: Wei Li, Beijing (CN); Ya Bo Li, Beijing (CN); Wei Xiong Shang, Beijing (CN); Zhe Xiang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 12/323,561

(22) Filed: Nov. 26, 2008

(65) Prior Publication Data
US 2009/0141872 A1 Jun. 4, 2009

(30) Foreign Application Priority Data
Nov. 30, 2007 (CN) .......................... 2007 1 0196053

(51) Int. Cl.
*H04M 3/00* (2006.01)
(52) U.S. Cl.
USPC ........................................ 379/266.1; 379/76
(58) Field of Classification Search ... 379/256.01–266.1
See application file for complete search history.

(56) References Cited

U.S. PATENT DOCUMENTS

| 6,002,760 | A  | * | 12/1999 | Gisby ....................... 379/266.01 |
| 6,724,885 | B1 | * | 4/2004  | Deutsch et al. .......... 379/265.02 |
| 7,219,134 | B2 | * | 5/2007  | Takeshima et al. ............ 709/217 |
| 2006/0126803 | A1 | * | 6/2006 | Patel et al. .................. 379/88.01 |
| 2006/0126804 | A1 | * | 6/2006 | Lee et al. .................... 379/88.01 |
| 2006/0167941 | A1 |   | 7/2006 | Huang et al. |
| 2006/0262921 | A1 | * | 11/2006 | Eppel et al. .............. 379/265.02 |

FOREIGN PATENT DOCUMENTS

EP 0 806 585 A2 11/1997

* cited by examiner

*Primary Examiner* — Simon Sing
(74) *Attorney, Agent, or Firm* — Cantor Colburn LLP; Preston Young (57) ABSTRACT

A method and apparatus for resuming a session between a client device and an IVR system in customer service. The method includes the following steps: reestablishing the session in customer service; determining whether there is status information of an abnormally terminated session corresponding to the reestablished session in customer service; retrieving the status information of the abnormally terminated session in customer service; and resuming the session between the client device and the IVR system in customer service according to the retrieved status information.

6 Claims, 6 Drawing Sheets

METHOD AND APPARATUS FOR RESUMING THE SESSIONS BETWEEN CLIENT DEVICE AND IVR SYSTEM

CROSS-REFERENCE TO RELATED APPLICATIONS

This application claims priority under 35 U.S.C. §119 to Chinese Patent Application No. 200710196053.5 filed Nov. 30, 2007, the entire contents of which are incorporated by reference herein.

BACKGROUND OF THE INVENTION

1. Field of the Invention

The invention relates to communication, specifically, the method and apparatus for resuming sessions between a client device and an IVR (Interactive Voice Response) system in customer services.

2. Description of the Related Art

Contact centers are becoming more and more popular to a lot of companies. A lot of companies are providing more services by way of contact centers. The working environment of a large contact center can be a room with lots of open cubical cells in which service representatives sitting in front of a computer with their earphones on, providing services to 'invisible' customers. Various resources needed by a contact center include human resources, computers and communication devices, among which the costs of human resources of service representatives are major costs.

Self services via the IVR system are usually adopted in phone based contact centers in order to improve the performance, such as to reduce latency, hang-up ratio and operational costs. The costs of human resources will be significantly reduced by using the IVR system which provides 7*24 full time services to the customers with fewer service representatives needed. Customers can obtain self services including caller identification, caller routing, information requesting and other transactions via the IVR system.

Figure 1:
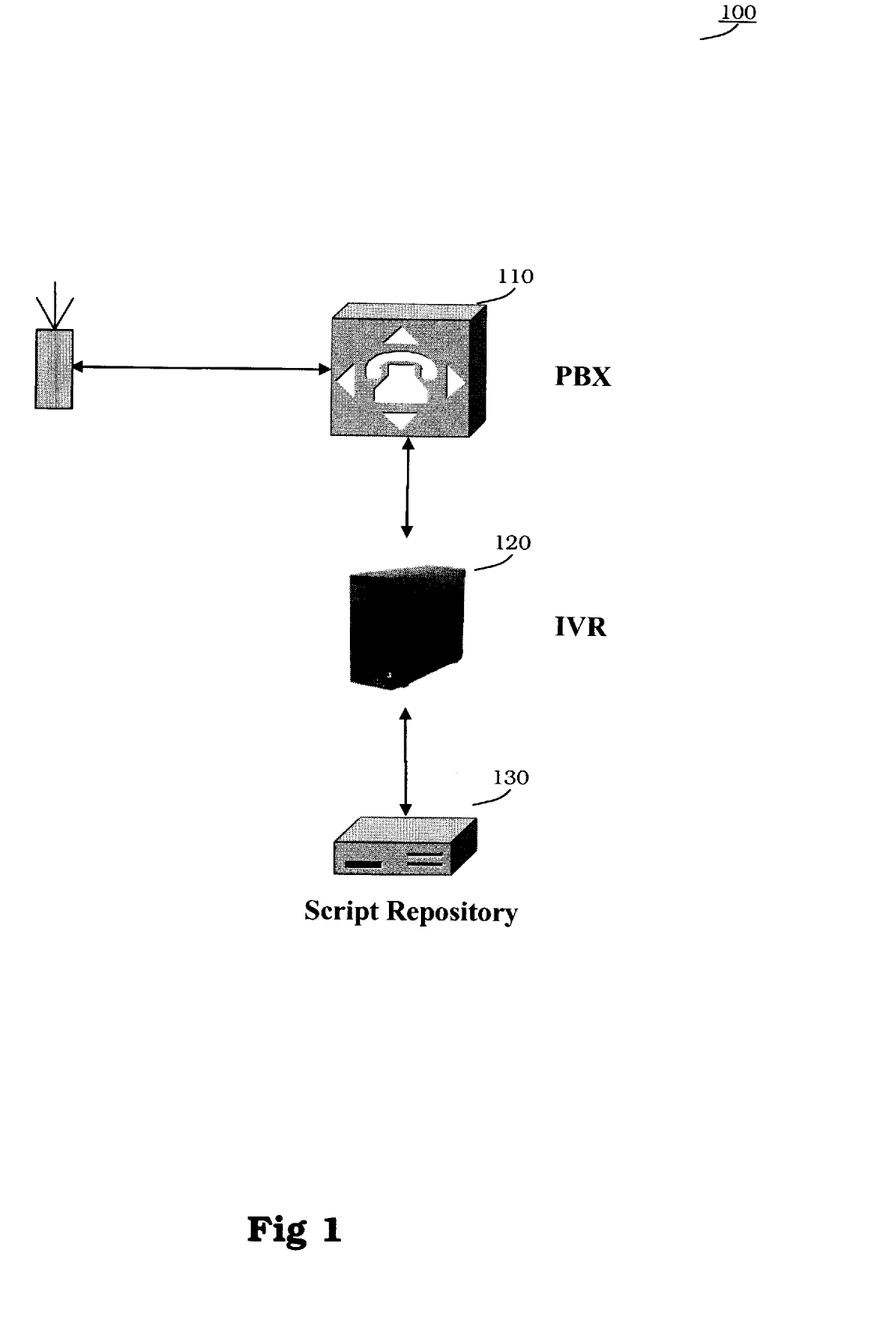
FIG. 1 is the block diagram 100 of the IVR system in the prior art.

FIG. 1 shows the structure of an IVR system 100 in the prior art. For phone services, when a call of a certain customer arrives at the Private Branch Exchange (PBX) 110, the PBX 110 sends information of the incoming call, including the calling number of the customer, to related components in the IVR system 120 for processing. In the meantime, the call enters the waiting queue in the IVR system 120 and gets connected when an IVR port becomes available. After connected, the IVR will provide the customer with a voice navigation menu from which the customer can select the wanted service according to the voice guidance, such as voice, fax or computer access, etc.

In most cases, phone based contact centers provide rather detailed menus for a customer to select. Therefore, the customer usually needs to narrow down his/her requests by selecting the menus from within the upper levels to the lower levels in order to obtain the wanted services. This can be a sequence of selections. For example, in FIG. 2, an IVR voice navigation menu is shown. Here, if the customer wants to get information about high density DVD, he/she may have to go through the menus and make the selection as follows: Department→DVD→High Density, altogether three levels of menus.

The session in customer service can be terminated due to various reasons before he/she can get the wanted service. For example, the customer will have to hang up when prompted with the message that no service personnel is available after he/she has gone through some level to level selection in the IVR system even though customer still needs more help from a service personnel. Another example would be the case where a mobile phone is used to reach the contact center. The connection with the contact center will probably be terminated before the customer can get the wanted service while moving due to an unstable wireless channel. A specific example could involve a tourist who is driving a car and wants to get some guidance from the contact center of a touring agency; the connection with the contact center may be terminated when he/she enters a tunnel or some other place with weak signals.

Incomplete service will significantly reduce the customer's satisfaction. The customer will have to re-input all the related information when he/she tries to reconnect to the contact center to get the wanted service. In one of the examples mentioned above, he/she will have to make the three-level selection again, which is troublesome and further reduce the satisfaction.

The line resource of the contact center will be used again because the customer will need to re-input all related information. During peak time, a new customer will probably have to hang up due to the busy line, and in the meantime, the retrying customer cannot get satisfactory service, further reducing the customer's satisfaction.

Accordingly, there is a need to solve the problems stated above.

SUMMARY OF THE INVENTION

In one aspect, the present invention provides a method for resuming a session between the client device and the IVR system in customer service including. The method includes reestablishing a session in customer service; determining whether there is status information of an abnormal terminated session corresponding to the reestablished session in customer service; retrieving the status information of an abnormally terminated session in customer service; and resuming the session between the client device and the IVR system in customer service according to the retrieved status information.

Another aspect of the invention provides an apparatus for resuming session between the client device and the IVR system in customer service. The apparatus includes: a session reestablishing module configured for reestablishing a session in customer service; a determining module configured for determining whether there is status information of the abnormally terminated session corresponding to the reestablished session in customer service; status information retrieving module configured for retrieving the status information of the abnormally terminated session corresponding to the reestablished session in customer service; and a session resuming module configured for resuming the session between the client device and the IVR system in customer service according to the retrieved status information.

Thus, the customer can be routed to the point where the customer's previous service session was terminated when he/she reconnects to the contact center after the previous session was terminated. There is no need to re-input all the information, thus improving the customer's satisfaction. Accordingly, the load of the contact center can be balanced and number of busy lines during peak time can be reduced so that the resources are be better utilized.

BRIEF DESCRIPTION OF THE DRAWINGS

The present invention will be described in detail with reference to the accompanying figures.

DETAILED DESCRIPTION OF PREFERRED EMBODIMENTS

The basic idea of the invention is to maintain the status information of the session in customer service. The session can be resumed at the point where it was terminated according to the maintained status information.

The voice navigation menu can be described by IVR menu scripts which are stored in the script repository 130. The following IVR example script corresponds to the menu of IVR system shown in FIG. 2.

Figure 2:
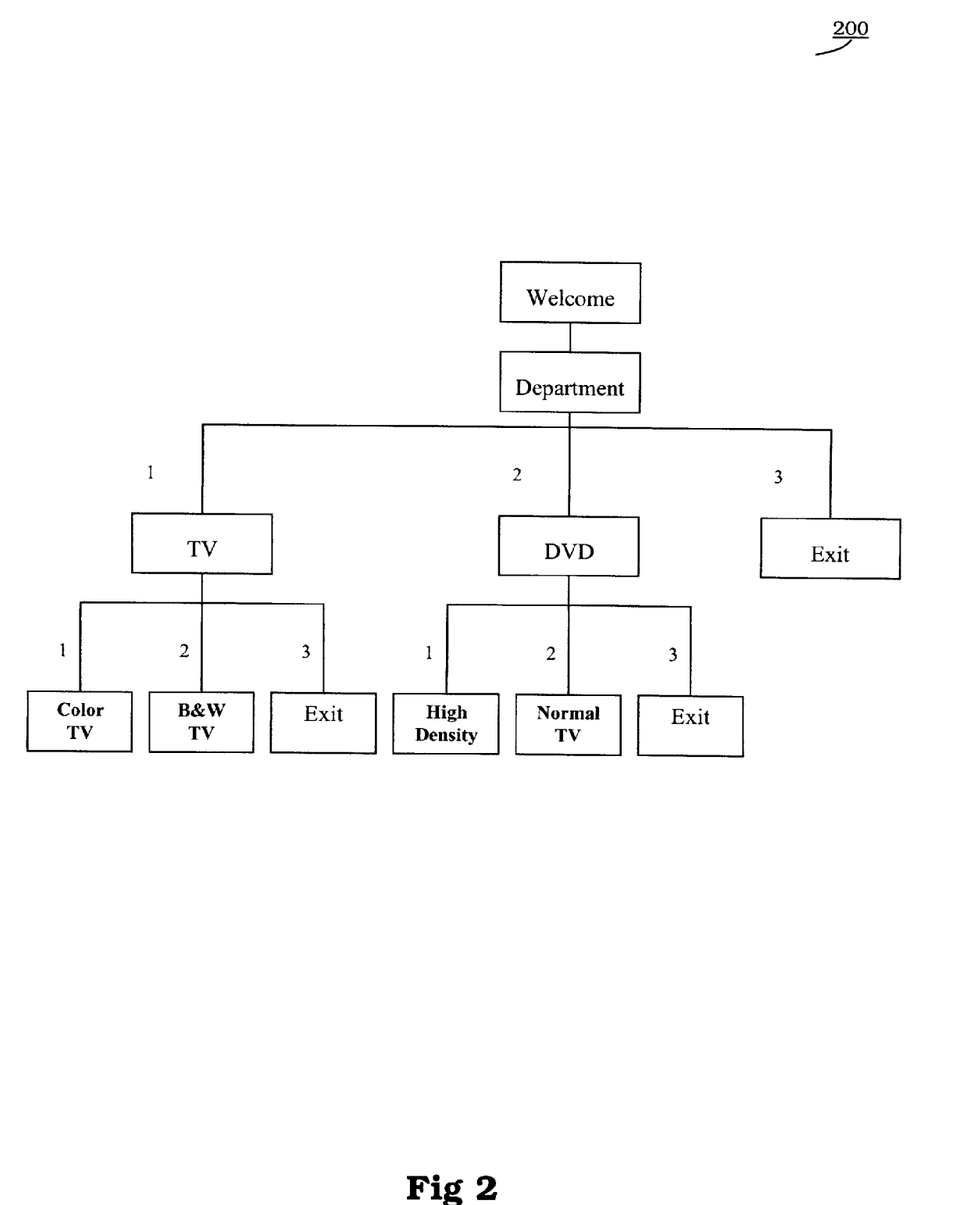
FIG. 2 is an example of the IVR voice navigation menu 200 in the prior art.

```
<?xml version="1.0" encoding="UTF-8"?>
<vxml version="2.0" xmlns="http://www.w3.org/2001/vxml">
<meta name="description" content="document navigation example"/>
<!-- start to interpret this file -->
<form id="welcome">
  <block>
     <prompt> Welcome. </prompt>
        <goto next="dept"/>
  </block>
</form>
<form id="dept">
  <var name="TV"/>
  <block name="TV">
     <prompt> TV Service Department. </prompt>
        <assign name="TV" />
        <goto next="TV_dept"/>
  </block>
    <block name="DVD">
     <prompt> DVD Service Department. </prompt>
     <assign name="DVD" />
        <goto next="DVD_dept"/>
  </block>
        <block name="quit">
     <prompt> Exit. </prompt>
        <goto quit/>
  </block>
</form>
<form id="TV-dept">
  <block name="Black&White">
        <prompt>Color TV Info.</prompt>
        <goto quit/>
  </block>
    <block name="Colored">
        <prompt>B&W TV Info. </prompt>
        <goto quit/>
  </block>
<block name="quit">
     <prompt> TV Exit. </prompt>
        <goto quit/>
  </block>
</form>
<form id="DVD-dept">
  <block name="high resolution">
        <prompt> High Density DVD. </prompt>
        <goto quit/>
    </block>
    <block name="general">
        <prompt> Normal DVD. </prompt>
        <goto quit/>
    </block>
   <block name="quit">
       <prompt> DVD Exit. </prompt>
         <goto quit/>
    </block>
</form>
</vxml>
```

In the above script, tags pair <form></form> is used to define menus in different levels such as 'Welcome (the first level)', 'Dept (the second level)', 'TV-dept or 'DVD-dept (the third level)'. Tags pair <block></block> is used to define options in the menus in different levels such as 'TV service department', 'DVD service department' and 'Exit' options in 'Dept' of the menu in the second level, 'Black&White', 'Color TV Info' and 'TV Exit' options in the menu of 'TV service department'.

Figure 3:
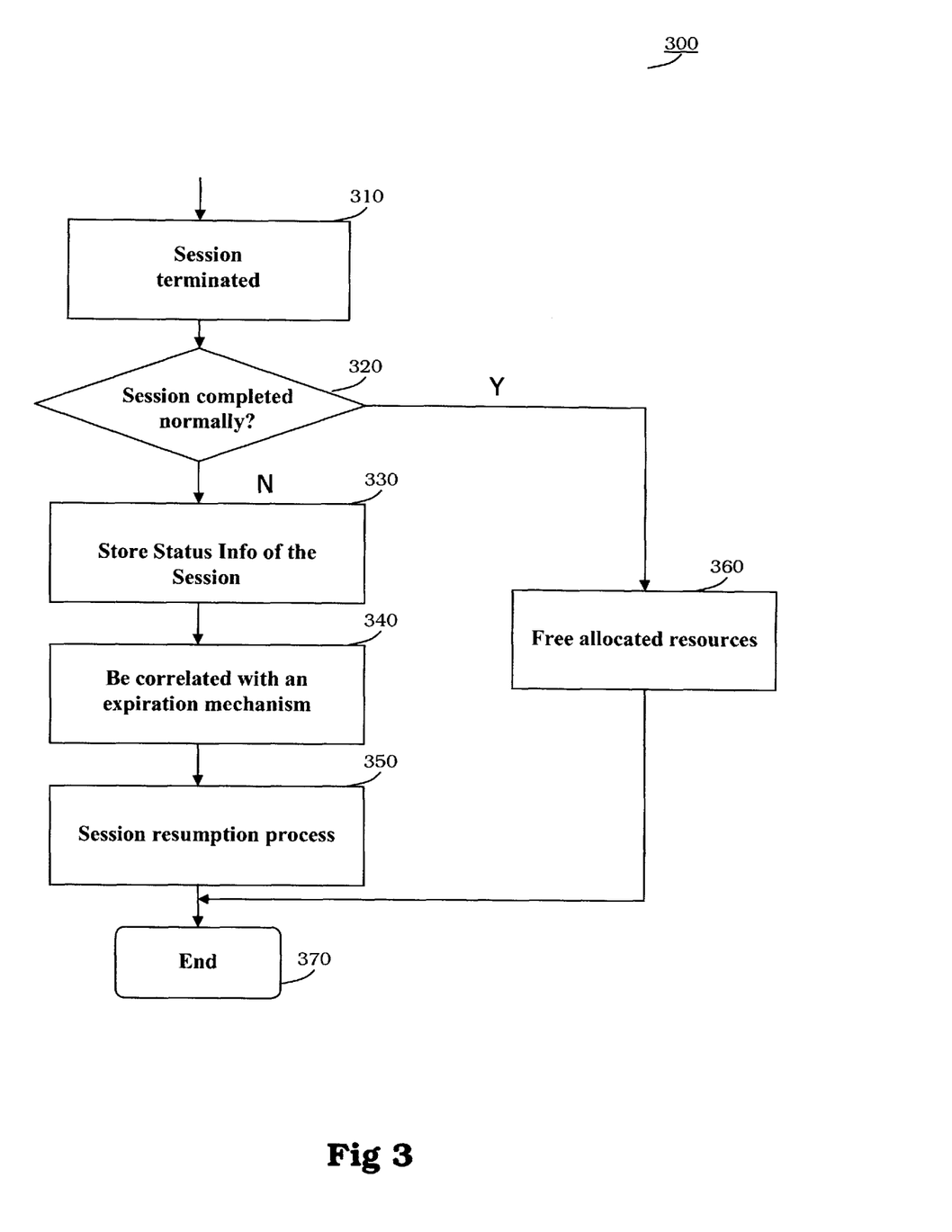
FIG. 3 is the flow chart 300 of a method for resuming the session between client device and the IVR system in customer service according to one aspect of the invention.

The embodiment of the method for resuming the session between the client device and the IVR system in customer service according to one aspect of the invention will be described herein below with reference to FIG. 3. FIG. 3 is the flow chart 300 of a method for resuming the session between client device and IVR system in customer service according to one aspect of the invention. The method 300 begins with step 310 in which the session in customer service is terminated. When termination is detected by the system, the determination of whether the session in customer service was completed normally is performed in step 320, e.g. the customer has completed self service or has received needed service via service representatives. There are several ways to determine whether the session in customer service has completed normally. One way is utilizing the support from the IVR system. The determination can be performed by analyzing parameters in the 'Release' request in the IVR protocol layer. For example, 'customer hang-up', 'timeout' and 'interrupted' are identified by different parameters in the 'Release' request, thus the determination can be performed by identifying said parameters. The determination of whether the customer has received the wanted service at hang-up can also be performed by analyzing the location of the voice navigation menu that the customer was in. For example, the customer hangs up the phone because all service representatives are not available after he/she has chosen to get service from service representatives. In this case, it can be determined that the session in customer service was not terminated normally.

If it is determined that the session in customer service was terminated abnormally in step 320, the flow enters step 330, in which the status information of the session in customer service is stored. This information generally includes the customer calling number, the abnormal termination of the service request (e.g. indicated by parameters in Q.850 signaling), and the key sequence input before the termination etc. Preferably, a correlation with an expiration mechanism can also be set up with the stored status information in step 340, and the expiration mechanism can be triggered when certain conditions predefined are met so that some stored status information can be deleted from in order to save memory resources. The expiration mechanism, for example, can be a timer, and the stored status information will be deleted if the predetermined time has passed since the timer is set. When the customer reconnects to the contact center, or the contact center thinks it is necessary, the flow enters step 350, in which the session resumption process is carried on and the session between customer and the contact center in customer service is resumed. The session resumption process will be described in detail below.

If it is determined that the session in customer service was completed normally in step 320, the flow enters step 360, in which the allocated resources are freed because there is no need to retain related resources.

Figure 4:
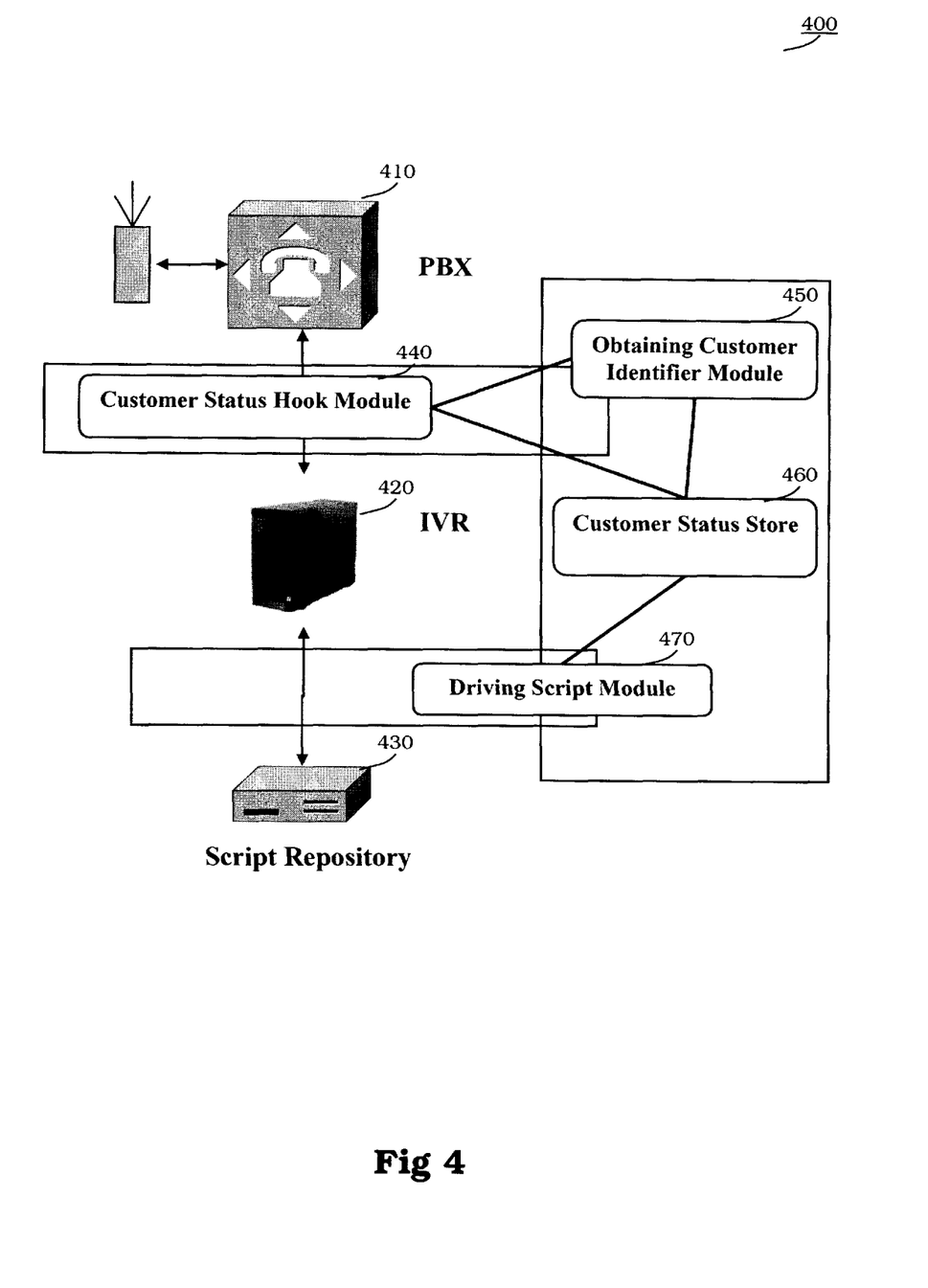
FIG. 4 is the block diagram 400 of a system for resuming the session between client device and the IVR system in customer service according to one aspect of the invention.

FIG. 4 is the block diagram 400 of a system for resuming the session between the client device and the IVR system in customer service according to one aspect of the invention. The system 400 according to the invention includes a customer status hook module 440, configured between PBX 410 and IVR 420, a customer status store 460 and a driving script module 470. The system 400 further includes obtaining a customer identifier module 450.

The method for resuming the session between the client device and the IVR system in customer service according to another aspect of the invention will be described with reference to FIG. 4. First, the customer status hook module 440 captures status information of the session in customer service. This information includes the calling number and the dialed number, the key sequence that the customer dialed detected by the Dual Tone Multiple Frequency (DTMF) detector and determinates whether the session in customer service was completed normally, such as by the information provided in Q.850 signaling (e.g. parameters in 'Release' request).

For example, if a customer Peter Zhao (calling number 58740001) connected to the contact center, pressed 1 for TV department, and then 1 for color TV information, then 3 for exiting to upper level, the session in customer service was terminated due to bad mobile connection when he is about to press 2 for DVD department, the information captured by the customer status hook module 440 includes: calling number 58748001, abnormal termination (indicated by parameters in Q.850 signaling), key sequences {1,1,3,2} right before the session was terminated, i.e., the customer is in 'DVD service department' in the IVR voice navigation menu.

After the customer status hook module 440 captures the status information of the session in customer service, alternatively, some other information, such as customer name, can be retrieved via interaction with obtaining the customer identifier module 450 and the backend server according to the calling number. The status information of the session in customer service is stored in the customer status store 460 after the customer status hook module 440 captured the status information, or after the obtaining customer identifier module 450 retrieved other information. In the example above, the status information stored in the customer status store 460 is:

```
<?xml version="1.0" encoding="UTF-8"?>
<meta name="description" content="document navigation example"/>
<presentity>
    <id phone_num="58740001" name="Peter Zhao"/>
    <status stat="DVD"/>
    <vxml_file filename="id99803.vxml"/>
<presentity>
```

After storing the status information of the session in customer service, preferably, the customized IVR menu script that corresponds to the status information of the session in customer service is created and stored in the script repository 430 by driving the script module 470 according to the status information of the session in customer service, or only the status information of the session in customer service is stored.

Figure 5:
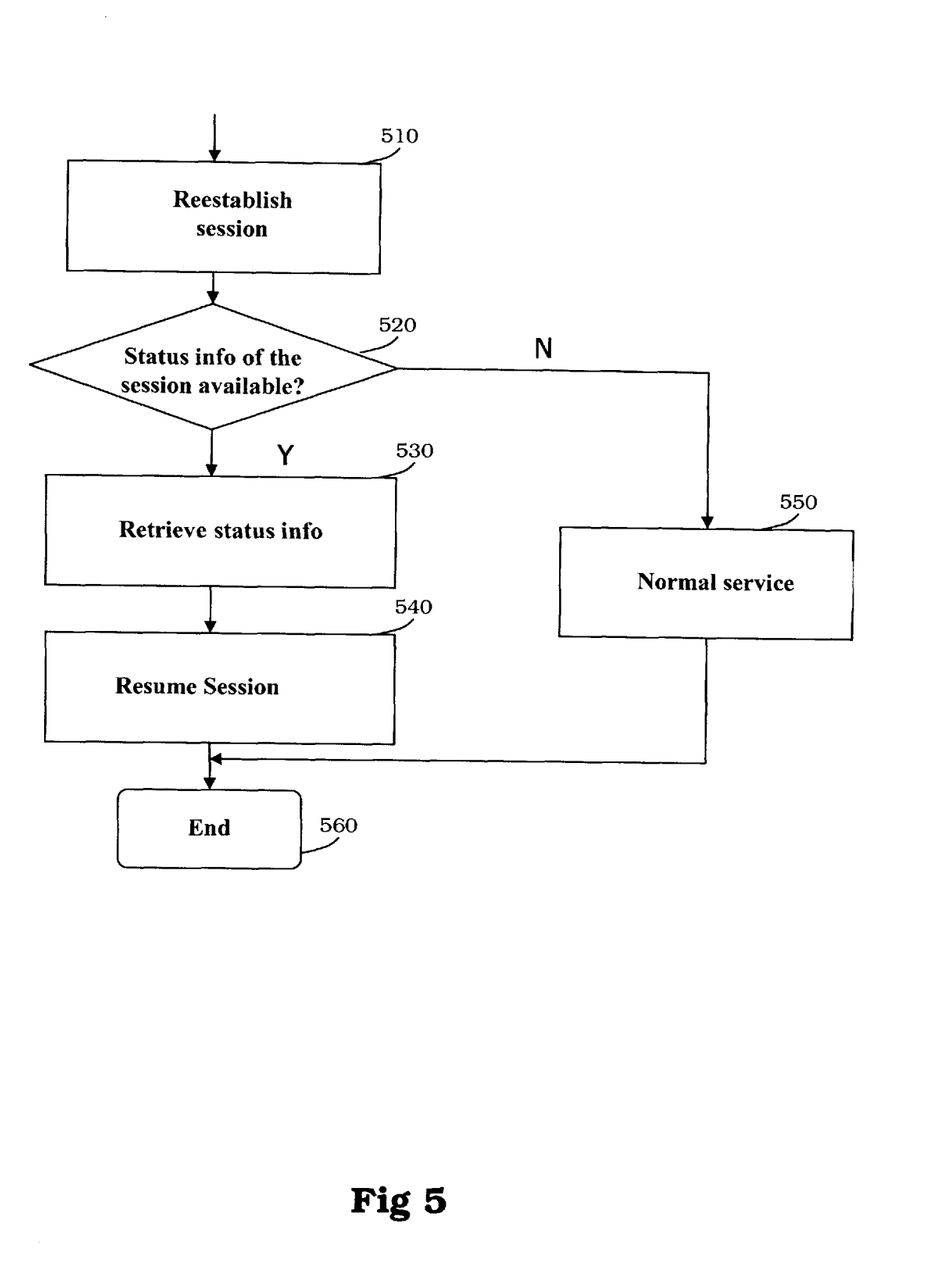
FIG. 5 is the flow chart 500 of a method for resuming the session between client device and the IVR system in customer service according to another aspect of the invention.

FIG. 5 is the flow chart 500 of a method for resuming the session between the client device and the IVR system in customer service according to another aspect of the invention. The method according to the invention begins at step 510, in which the session in customer service is reestablished. At step 520, the determination of whether there is status information of an abnormal terminated session corresponding to the reestablished session in customer service is performed. If yes, the flow enters step 530, in which the status information of abnormal terminated session in customer service was retrieved. After retrieval of the information, the flow enters step 540, in which the session between the client device and the IVR system in customer service is resumed. If it is determined that there is no such status information corresponding to the reestablished session in customer service at step 520, the flow enters step 550, and the normal IVR service will be provided.

Figure 6:
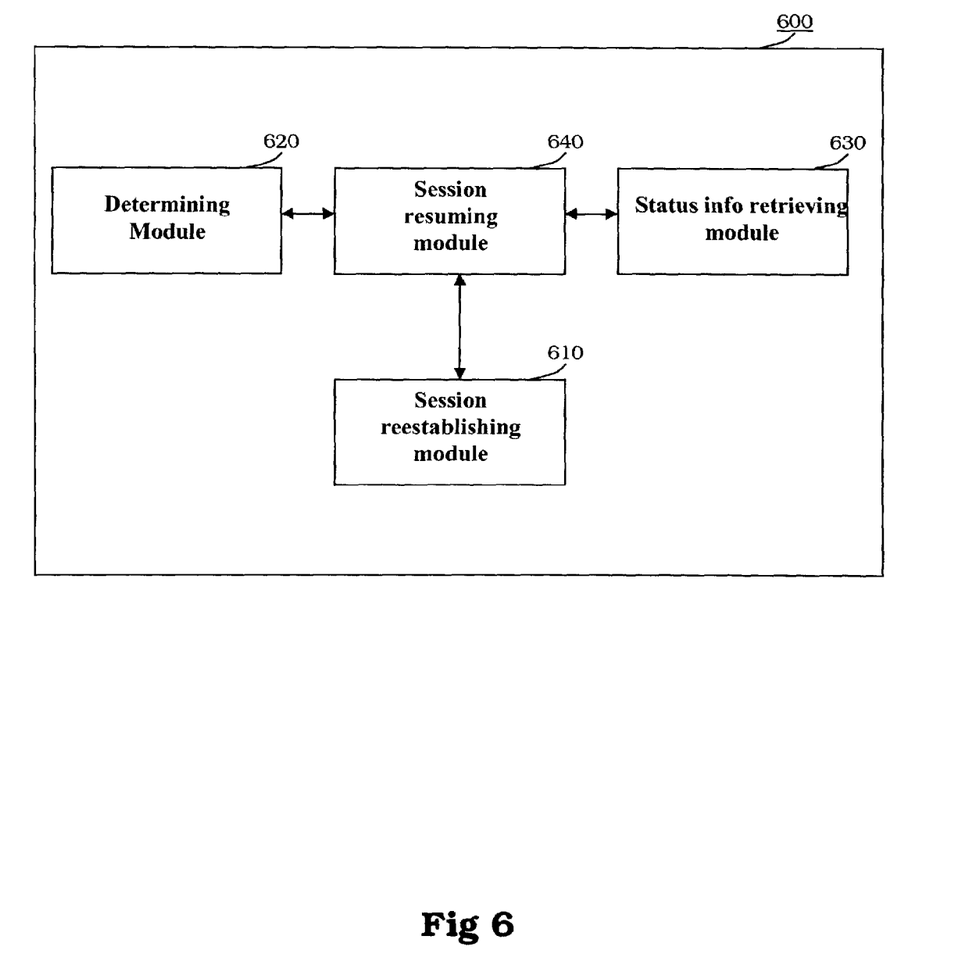
FIG. 6 is the block diagram 600 of an apparatus for resuming the session between client device and the IVR system in customer service according to another aspect of the invention.

FIG. 6 is the block diagram 600 of an apparatus for resuming the session between the client device and the IVR system in customer service according to another aspect of the invention. The apparatus 600 according to the invention includes a session reestablishing module 610, a determining module 620, a status information retrieving module 630 and a session resuming module 640. The session reestablishing module 610 is configured to reestablish customer service session after abnormal termination. There are several ways to reestablish the session.

1) To call back to reestablish the session.

2) SMS or other way to send message to the customer. The message includes a specific access code for the customer to input when he/she reconnects to the contact center. By way of the access code, the customer will be routed to the point where the previous session in customer service was abnormally terminated. The access code identifies the status information corresponding to the abnormally terminated session in customer service.

3) The customer reconnects to the IVR system.

When the session in customer service is reestablished using any abovementioned way, the determining module 620 will determine whether there is status information corresponding to the abnormally terminated session in customer service. If yes, the status information will be retrieved by the status information retrieving module 630 and then the session will be resumed according to the retrieved status information by the session resuming module 640.

The session resumption process will be described with reference to FIG. 4. When the determining module 620 determines there is status information of the abnormally terminated session corresponding to the reestablished session in customer service, the status information retrieving module 630 will retrieve the status information from customer status store 460. Then the session resuming module 640 will invoke the customized IVR menu script which corresponds to the status information stored in the script repository 430, and resume the session in customer service at the point where it was terminated; or the status information retrieving module 630 will retrieve from the customer status store 460 the status information corresponding to the abnormally terminated session in customer service and then the session resuming module 640 will instruct the script diver 470 to create a customized IVR menu script corresponding to the retrieved status information, and then resume the session at the point where it was abnormally terminated. It should be known to the skilled in the art that the status information retrieving module 630 can retrieve the script corresponding to the stored status information from the script repository 430 or customer status store 460 or any other location. For the example above, the customized IVR menu script is:

```
<?xml version="1.0" encoding="UTF-8"?>
<vxml version="2.0" xmlns="http://www.w3.org/2001/vxml">
<meta name="description" content="document navigation example"/>
<!-- start to interpret this file -->
<form id="welcome">
    <block>
        <prompt> Welcome. </prompt>
            <goto next="dvd_dept"/>
    </block>
</form>
<form id="DVD_dept">
    <block name="high resolution">
         <prompt> High Density DVD. </prompt>
         <goto quit/>
    </bock>
    <block name="general">
        <prompt> Normal DVD. </prompt>
        <goto quit/>
    </block>
    <block ="other dept">
        <prompt> Other Dept Service. </prompt>
        <goto next = "dept"/>
     </block>
    <block name="quit">
       <prompt> DVD Exit. </prompt>
          <goto quit/>
    </block>
</form>
<form id="dept">
    <var name="TV"/>
    <block name="TV">
       <prompt> TV Service Department. </prompt>
            <assign name="TV" />
            <goto next="TV_dept"/>
    </block>
      <block name="DVD">
       <prompt> DVD Service Department. </prompt>
       <assign name="DVD" />
          <goto next="DVD_dept"/>
    </block>
          <block name="quit">
       <prompt>Exit. </prompt>
           <goto quit/>
    </block>
</form>
<form id="TV_dept">
    <block name="Black&White">
         <prompt>Color TV Info.</prompt>
         <goto quit/>
    </block>
    <block name="Colored">
        <prompt>Black&White. </prompt>
        <goto quit/>
    </block>
<block name="quit">
    <prompt> TV Exit. </prompt>
        <goto quit/>
    </block>
</form>
</vxml>
```

The italic part in the customized IVR menu script above is where the session in customer service was abnormally terminated. When the customer reconnects to the IVR system, he/she will be routed to the point where the session was abnormally terminated, i.e. DVD department.

The apparatus for resuming the session between client device and the IVR system in customer service according to the invention can be located in any possible location and can be in the form of software, hardware or any combination thereof.

Although the embodiments of the invention are described in detail above in connection with the drawings, it should be understood that all the embodiments described are only for the purpose of illustrating the invention, and thus will not limit the invention. For those skilled in the art, variations and modifications can be made without departing from the spirit and scope of the invention, which is defined by the appended claims and their equivalents.

We claim:

1. A method for resuming a session between a client device and an IVR system in customer service, the method comprising the steps of:
   reestablishing said session in customer service;
   determining whether there is status information of an abnormally terminated session corresponding to said reestablished session in customer service;
   retrieving said status information of said abnormally terminated session in customer service to produce retrieved status information;
   resuming said session between said client device and said IVR system in customer service according to said retrieved status information;
   storing said retrieved status information to produce a stored status in response to said abnormally terminated session in customer service;
   creating a new customized IVR menu script according to said status information of the session; and
   resuming said session in customer service according to said new customized IVR menu script,
   wherein said stored status information is correlated with an expiration mechanism such that said expiration mechanism can be triggered when certain conditions predefined are met so that some stored status information can be deleted, and
   wherein the new customized IVR menu scrip rearranges a previous menu scrip based on the retrieved status information.

2. The method according claim 1, wherein said status information comprises:
   a calling number;
   a status information of abnormally terminated session in customer service; and
   a key sequence before said abnormally terminated session.

3. The method according to claim 1, wherein the step of reestablishing said session in customer service is carried out through:
   a) said IVR system calling back;
   b) said IVR system sending an access code for resuming said session; and
   c) said customer reconnecting said IVR system.

4. An apparatus for resuming a session between a client device and an IVR system in customer service, the apparatus comprising:
   a session reestablishing module configured for reestablishing said session in customer service;
   a determining module configured for determining whether there is status information of an abnormally terminated session corresponding to said reestablished session in customer service;
   a status information retrieving module configured for retrieving said status information of said abnormally terminated session corresponding to said reestablished session in customer service;
   a session resuming module configured for resuming said session between said client device and said IVR system in customer service according to said retrieved status information;
   a module for storing said status information of said sessions in response to said abnormal terminated session in customer service:
   a module for creating a new customized IVR menu script according to said status information of the session; and a module for resuming said session in customer service according to said new customized IVR menu script, wherein said stored status information is correlated with an expiration mechanism such that said expiration mechanism can be triggered when certain conditions predefined are met so that some stored status information can be deleted, and wherein the new customized IVR menu scrip rearranges a previous menu scrip based on the retrieved status information.

5. The apparatus according claim 4, wherein said status information comprises:
 a calling number;
 said abnormal terminated session in customer service; and
 a key sequence before said abnormally terminated session in customer service.

6. The apparatus according to claim 4, wherein said session reestablishing module reestablishes said session in customer service through:
 a) said IVR system calling back;
 b) said IVR system sending an access code for resuming said session; and
 c) said customer reconnecting said IVR system.

\* \* \* \* \*